(12) United States Patent
Besselman

(10) Patent No.: US 7,322,750 B1
(45) Date of Patent: Jan. 29, 2008

(54) LOCKING ENGINE BEARING SPLAY CAP

(76) Inventor: Ronnie Besselman, 700 First Capitol Dr., St. Charles, MO (US) 63301

( * ) Notice: Subject to any disclaimer, the term of this patent is extended or adjusted under 35 U.S.C. 154(b) by 94 days.

(21) Appl. No.: 11/283,256

(22) Filed: Nov. 18, 2005

(51) Int. Cl.
*F16C 9/02* (2006.01)
*F16C 17/02* (2006.01)

(52) U.S. Cl. ............ 384/432; 384/433; 384/434; 123/195 R

(58) Field of Classification Search ............ 123/195 R; 384/432–434; 29/888.01
See application file for complete search history.

(56) References Cited

U.S. PATENT DOCUMENTS

| | | | | |
|---|---|---|---|---|
| 3,411,378 A | * | 11/1968 | Boregeaud | 74/579 R |
| 3,464,746 A | * | 9/1969 | Weber | 384/432 |
| 4,278,055 A | * | 7/1981 | List et al. | 123/195 S |
| 4,630,579 A | * | 12/1986 | Atkin | 123/195 R |
| 5,716,145 A | * | 2/1998 | Eidenbock et al. | 384/434 |
| 6,086,258 A | * | 7/2000 | Cadle et al. | 384/294 |
| 6,422,755 B1 | * | 7/2002 | Cadle et al. | 384/433 |
| 6,431,759 B1 | * | 8/2002 | Luchner et al. | 384/434 |
| 6,471,406 B1 | * | 10/2002 | Cadle et al. | 384/433 |

* cited by examiner

*Primary Examiner*—Stephen K. Cronin
*Assistant Examiner*—Ka Chun Leung
(74) *Attorney, Agent, or Firm*—Kevin L. Klug

(57) ABSTRACT

A locking engine splay cap apparatus and method of use and manufacture comprising a splay cap and an engine block base having uniquely positioned and formed slots and protrusions which integrally mate. The mating provides optimum register of the internal combustion engine main bearing caps whereby cap chatter and inward deformation is minimized. The method of use allows smaller displacement and more efficient engines to produce higher powers without compromising reliability and durability.

9 Claims, 8 Drawing Sheets

LOCKING ENGINE BEARING SPLAY CAP

BACKGROUND OF THE INVENTION

The art of the present invention relates to automotive engine crankshaft bearing caps in general and more particularly to an improved internal combustion engine bearing splay cap which uniquely registers with the engine block whereby a phenomena called "cap chatter" is minimized.

Internal combustion engines in part comprise an engine block having a crankshaft which is rotatably mounted within main bearings (traditionally a split sleeve bearing shell lined with a babbitt material). As aforesaid, the main bearings are usually split into halves and further mounted within the bearing seats formed between the engine block and the main bearing caps. That is, conventional engine blocks typically have half of the seat formed within the engine block base and half of the seat formed within each main bearing cap. Each of said seats are typically notched in order to secure and prevent spin of said main bearings via a protrusion on each of said bearing shell halves. The conventional engine block half seat also has an oil port which provides a pressurized oil flow through a hole within the main bearing half within the engine block half seat. When the main bearing caps are positioned and bolted onto and with said engine block base, a complete bearing seat is formed with the crankshaft rotatably held within said split main bearings. A conventional "V" type engine block typically contains one more bearing seat than the number of cylinders divided by two.

Conventional main bearing caps are typically machined castings held with the engine block via two bolts or studs through separated mounting holes on each side of the half seat. That is, each bolt fits through the cap and threads into a corresponding threaded hole within the engine block. Each conventional cap typically registers or positions via a shoulder on each side (outside) of said cap. That is, a conventional engine block typically has a recessed channel machined to a width substantially representing the shoulder-to-shoulder distance of said cap. The cap intimately fits within this channel and thereby is positioned or registered. When registered, the half seats of the block and cap form an optimum and aligned full bearing seat, especially after the seats are bored.

Modern internal combustion engines obtain significantly more horsepower from a smaller displacement. The increased efficiency provided by a smaller displacement engine is highly desirable for contemporary vehicle propulsion. Unfortunately, the increased stresses associated with the aforesaid requires improvements in conventional engine components, especially main bearing caps, in order to provide the durability and reliability of predecessor low power designs. Although sufficient for low power output operations, conventional main bearing cap configurations present significant durability and reliability issues when utilized with modern high power engines. When utilized with a higher engine power output, conventional caps tend to lose the aforesaid register. That is, the bearing seat halves tend to deform and no longer form an optimum circular full bearing seat. When higher power is applied, conventional cap seat walls tend to deform and the wall sides near the engine block tend to move toward the crankshaft centerline. (i.e. inward) This deformation is especially possible within the prior art since the there is no registration structure prohibiting cap deformation inward toward the crankshaft centerline. Main cap register failure typically creates what is known in the art as a main cap chatter. Main cap chatter has serious operational effects on an internal combustion engine including but not limited to premature main bearing and crankshaft failure, reduced efficiency, reduced output power, reduced oil pressure, and an introduction of harmful crankshaft harmonics.

The present art main cap represents a uniquely splayed cap in conjunction with a uniquely modified engine block which forms the apparatus and method of installation and use, all of which uniquely register in a fashion which minimizes the possibility of cap chatter or deformation. The term "splayed" means to be spread out or further apart. Splayed main bearing caps are spread further at the interface with the engine block. In short, a splayed cap is wider than a conventional cap and typically has four instead of two bolts for attachment. Splaying the caps provides superior strength relative to conventional caps, thereby allowing for reliable use within high power output internal combustion engines.

Although splayed caps have been found within the prior art, said prior art splayed caps register as conventional caps and exhibit the registration inadequacies associated with the prior art. That is, they only position or register with the engine block at the outside of the cap via a shoulder on each side. Since the splay cap is substantially wider than the conventional cap, registration of the prior art cap occurs over a wider distance than desired. That is, since the shoulder to seat distance for a conventional cap may be approximately an inch, for a prior art splay cap, the shoulder to seat distance is near three inches. Since the metallic cap material (typically a high carbon steel) has elastic properties for the same modulus of elasticity (Young's modulus) and applied crankshaft force, the prior art wider registering splay cap will allow for a greater movement between the cap and seat halves. (i.e. greater strain for equivalent stress) Unfortunately, this movement results in the same undesirable cap chatter and deformation which is present within conventional main bearing caps. Also, as with conventional caps, there is no structure to prohibit inward movement of the cap seat walls.

The present art splay cap represents a uniquely registered splay cap apparatus and method of manufacture, installation, and use which provides the benefits of the prior art splay cap strength while further registering the cap much closer to the bearing seat in a form which minimizes bearing seat wall movement in any direction. The present art minimizes the deleterious effects of material elasticity over greater distances by utilizing cap slots which intimately mate with uniquely formed engine block protrusions near the bearing seat. The present art thereby provides a more secure lock of the cap into the block and minimizes the ability of the cap to move inward. All of the aforesaid provide greater stability and durability than prior art splay caps.

Accordingly, an object of the present invention is to provide a locking engine splay cap and method of manufacture and use which locks the cap with the block and eliminates the ability of the cap to move inward.

Another object of the invention is to provide a locking engine splay cap and method of manufacture and use which minimizes main bearing seat deformation and cap chatter.

Another object of the invention is to provide a locking engine splay cap and method of manufacture and use which has more cross sectional strength than conventional main bearing caps while providing a registration which minimizes deformation due to material elasticity.

A further object of the present invention is to provide a locking engine splay cap and method of manufacture and use which locks in with the engine block.

A still further object of the invention is to provide a locking engine splay cap and method of manufacture and use which reduces distortion of the main bearing bores by increasing the cap's resistance to closing under high loads.

SUMMARY OF THE INVENTION

To accomplish the foregoing and other objects of this invention there is provided a locking engine splay cap and method of manufacture and use for obtaining optimum efficiency and durability from high power engines. The apparatus and method especially minimize the cap chatter and deformation associated with prior art main bearing caps.

The apparatus is provided as a unique splayed cap in conjunction with an engine block base designed to intimately mate with said splayed cap. For a preferred embodiment, the splayed cap (also known as a splay cap) comprises a bottom side having a half bearing seat with a half circular form and an engine block interface of substantially planar form, a front side and a rear side having two separated cap slots translating there between within said interface (one on each side of said half bearing seat), a right side having a right side shoulder, a left side having a left side shoulder, and a top side having four mounting holes bored through said cap and exiting at said interface. Two of said mounting holes are separated and positioned between said left side and the cap half seat and the remaining two are mirrored in position between said right side and said cap half seat. In the preferred embodiment, each cap slot is positioned between said two mounting holes on each side of said cap half seat. Also in the preferred embodiment, the mounting holes nearest said right and left sides are canted outward or toward their respective right or left sides in the transition between the top side and engine block interface.

In the preferred form, the engine block base which mates with the engine block interface of the locking engine splay cap has the conventional attributes understood by those skilled in the art with the modifications as described herein. That is, the engine block base has the conventional engine block attributes including half seats with half seat notches for the bearing shell halves, threaded cap holes which are separated and align with the two cap mounting holes nearest said cap half seat, and a main channel which approximates the right to left shoulder distance of a traditional main bearing cap. The present art modifies the conventional block attributes by forming (usually via vertical or horizontal milling) right and left splay cap channels to the right and left of the engine block half seats with each having right and left channel shoulders respectively which respectively mate with the separated right and left side shoulders of the splay cap. Said cap channels have a width and placement which does not overlap the main channel and further forms the engine block protrusions between the cap channels and the main channel when the cap channels are formed. The engine block protrusions as afore described mate with the cap slots to provide an optimum cap register and further minimize the inward movement of the cap toward the crankshaft centerline. The present art further modifies the conventional block attributes by placing threaded splay holes within said right and left splay cap channels which follow the cant angle of the splay cap mounting holes nearest said right and left sides.

For the preferred embodiment, the present art splay caps and block modifications are not utilized at the end cap locations representing crankshaft input and output. For the preferred embodiment, traditional form bearing caps are utilized at the end bearing locations. Alternative embodiments may utilize present art splay caps and block modifications at more or less locations than the preferred embodiment.

The art of the present invention may be manufactured from a plurality of materials including but not limited to steels, high carbon steels, tool steels, stainless steels, titanium, aluminum, (and alloys thereof) and high temperature composites.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
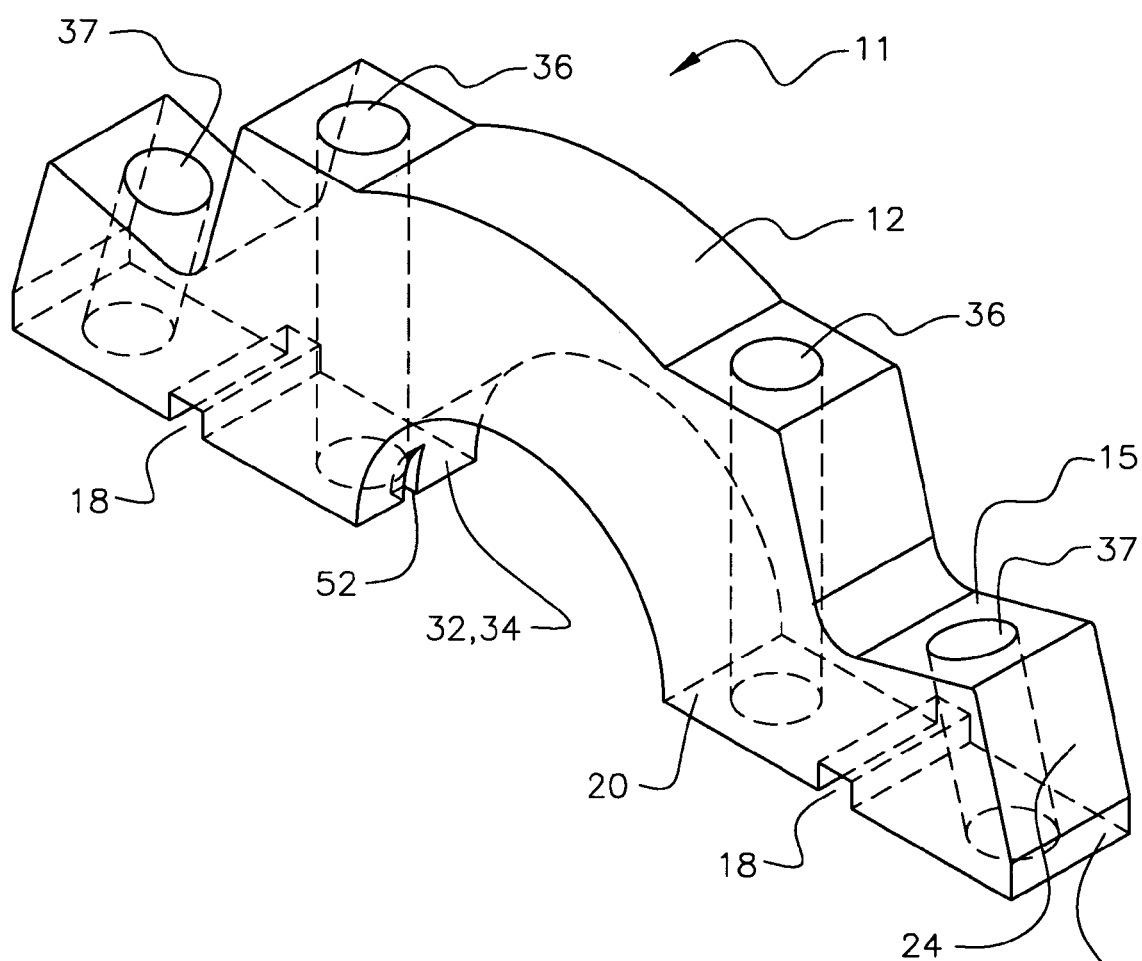
FIG. 1 is a front perspective view of a locking engine splay cap of the present invention shown apart from an engine block.
Figure 2:
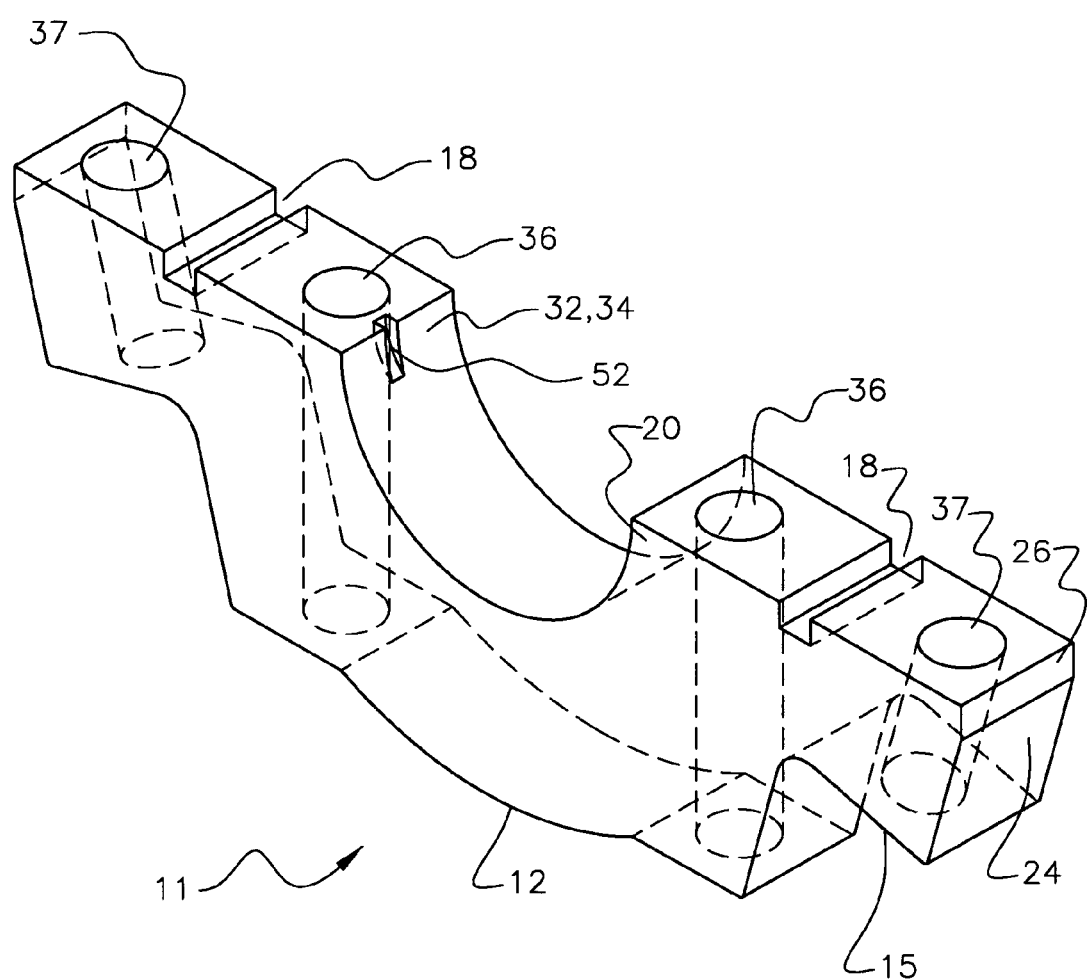
FIG. 2 is rear perspective view of a locking engine splay cap of the present invention shown apart from an engine block.
Figure 3:
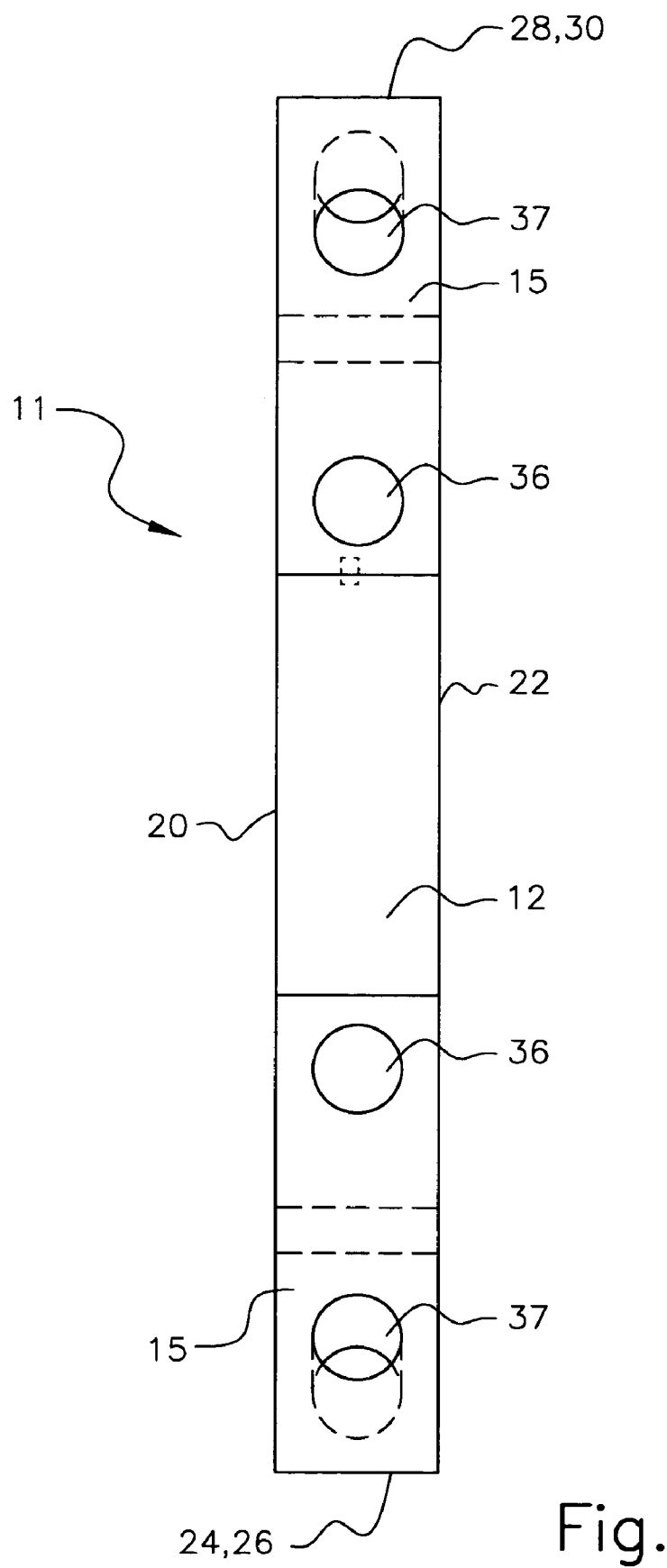
FIG. 3 is a top plan view of a locking engine splay cap of the present invention shown apart from an engine block.
Figure 4:
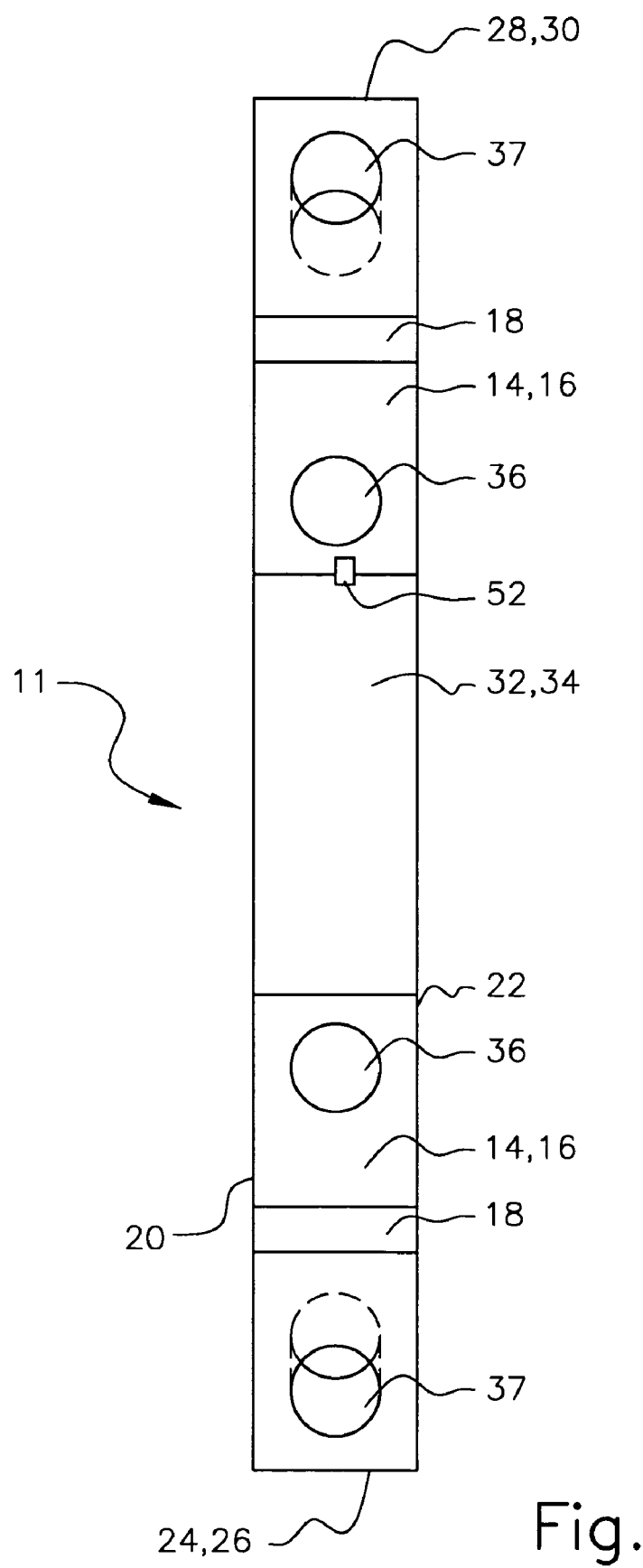
FIG. 4 is a bottom plan view of a locking engine splay cap of the present invention shown apart from an engine block.
Figure 5:
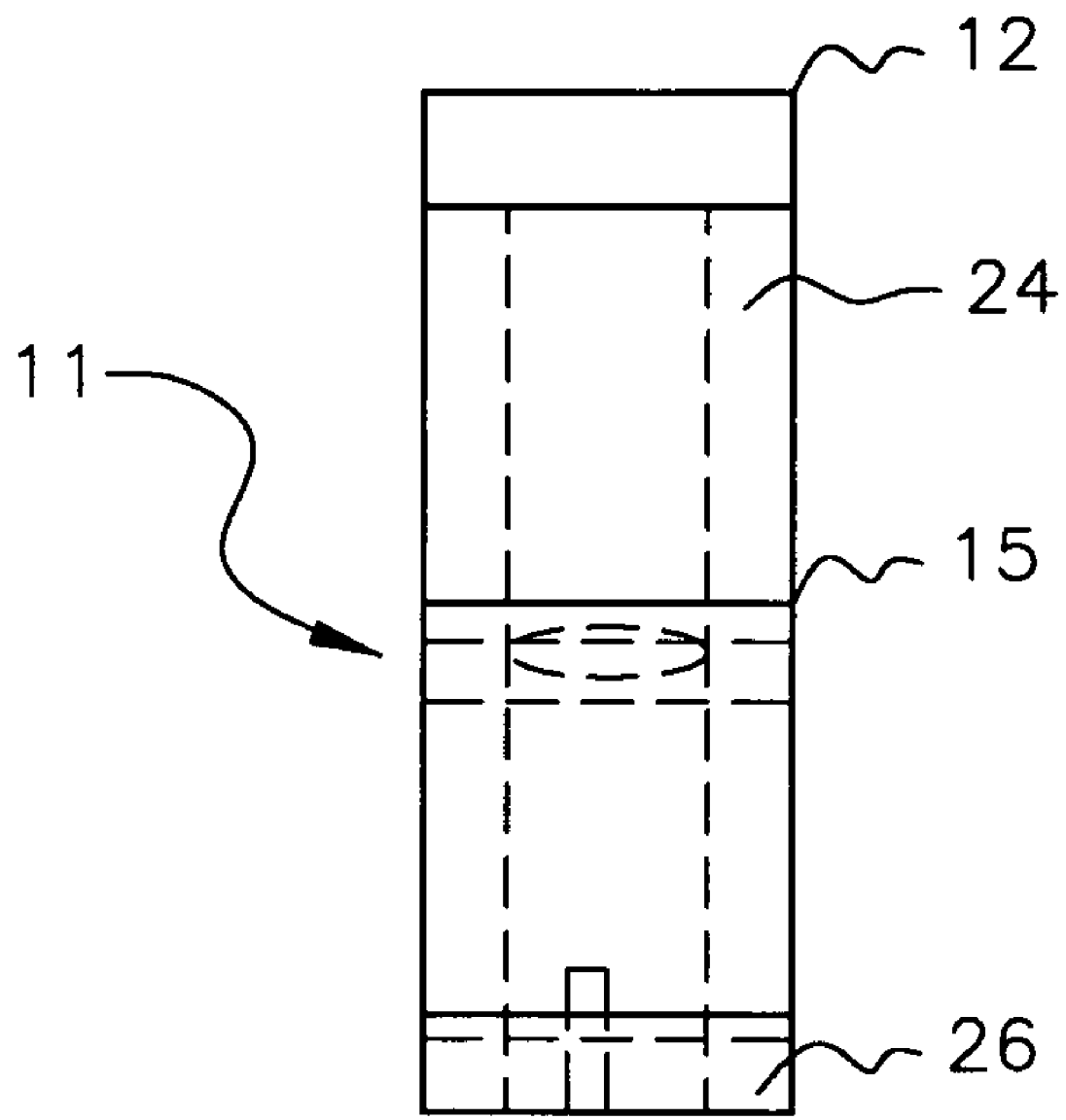
FIG. 5 is a right plan view of a locking engine splay cap of the present invention shown apart from an engine block, a left side plan view being substantially symmetrical therewith.
Figure 6:
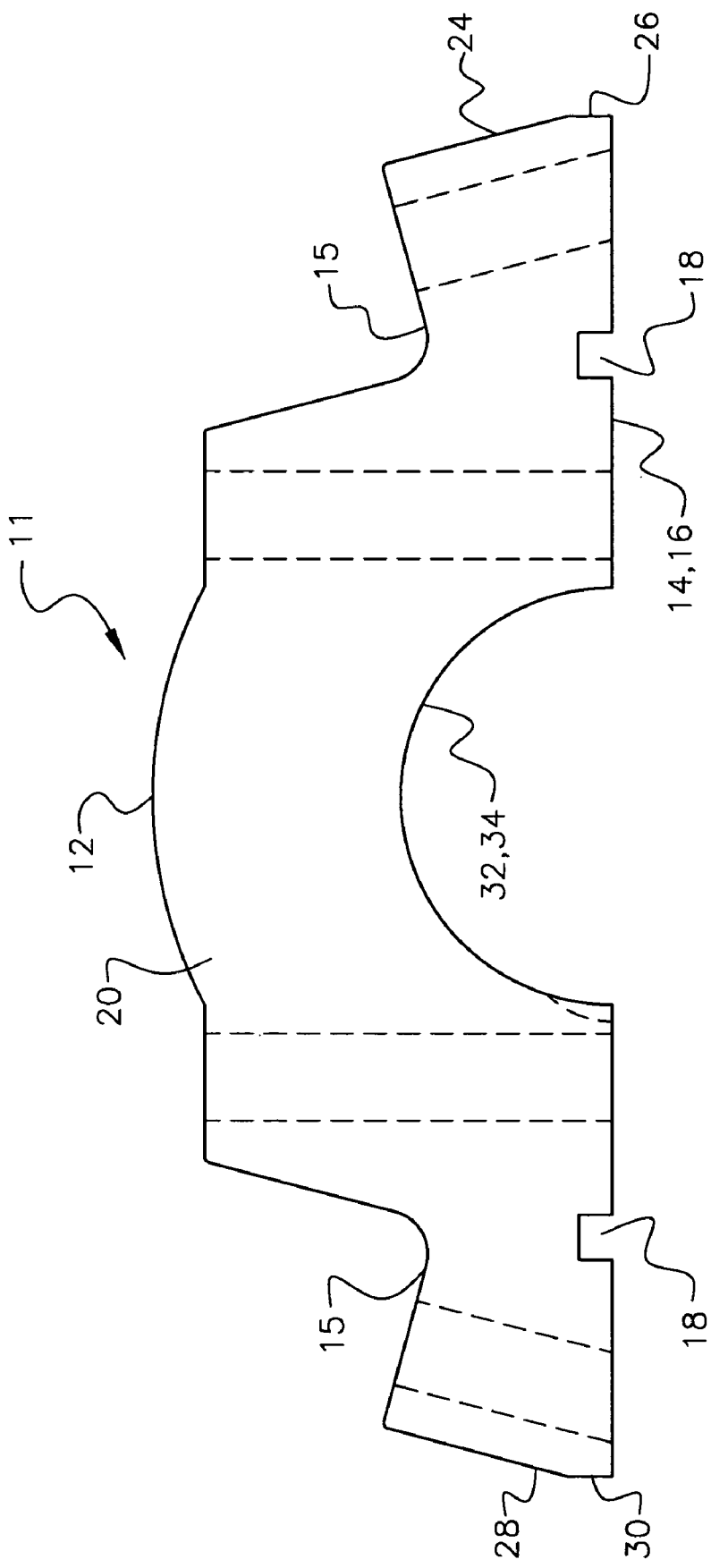
FIG. 6 is a front plan view of a locking engine splay cap of the present invention shown apart from an engine block.
Figure 7:
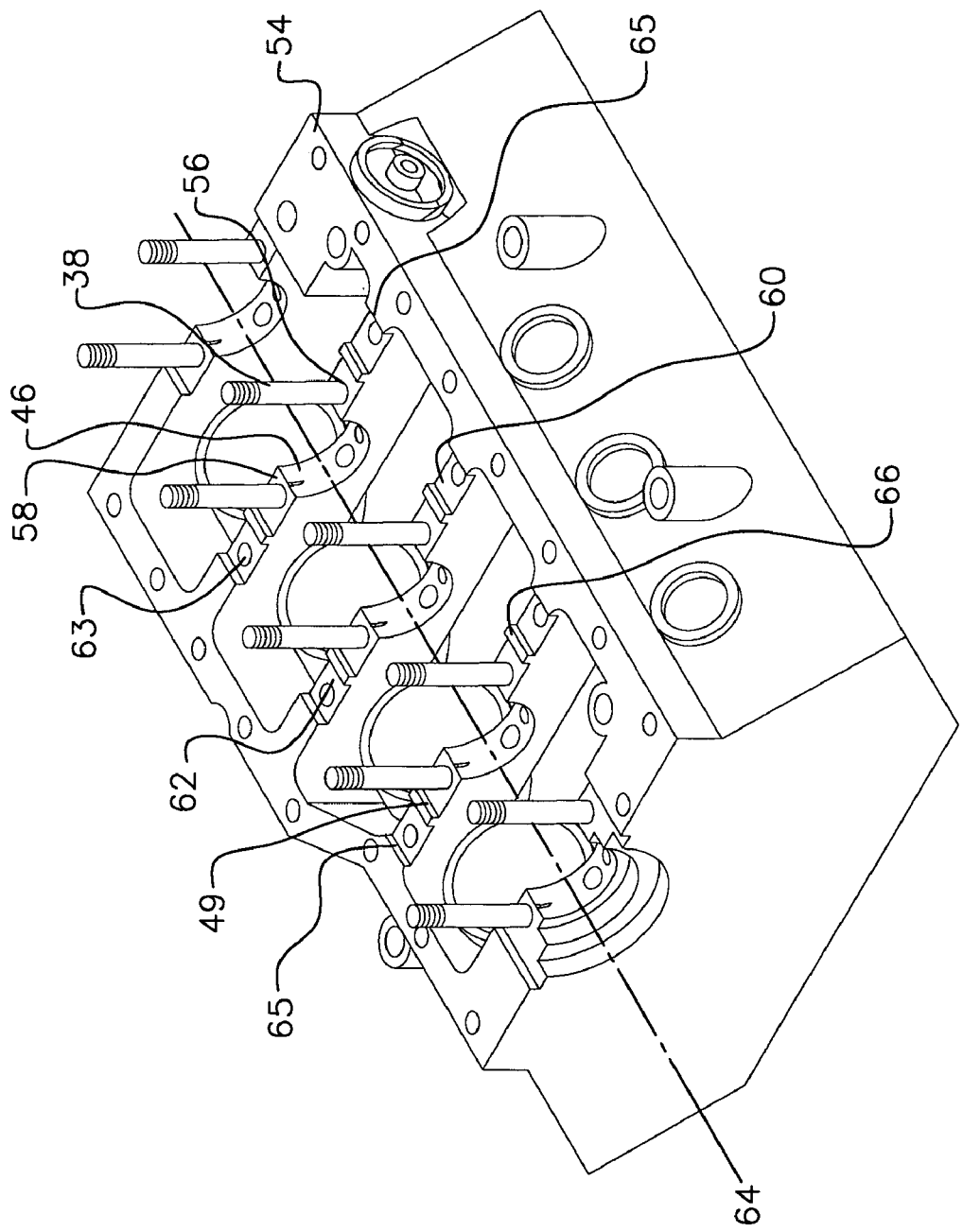
FIG. 7 is a front perspective view of an engine block base of the present invention showing the present art cap channels and protrusions not found on conventional engine blocks.
Figure 8:
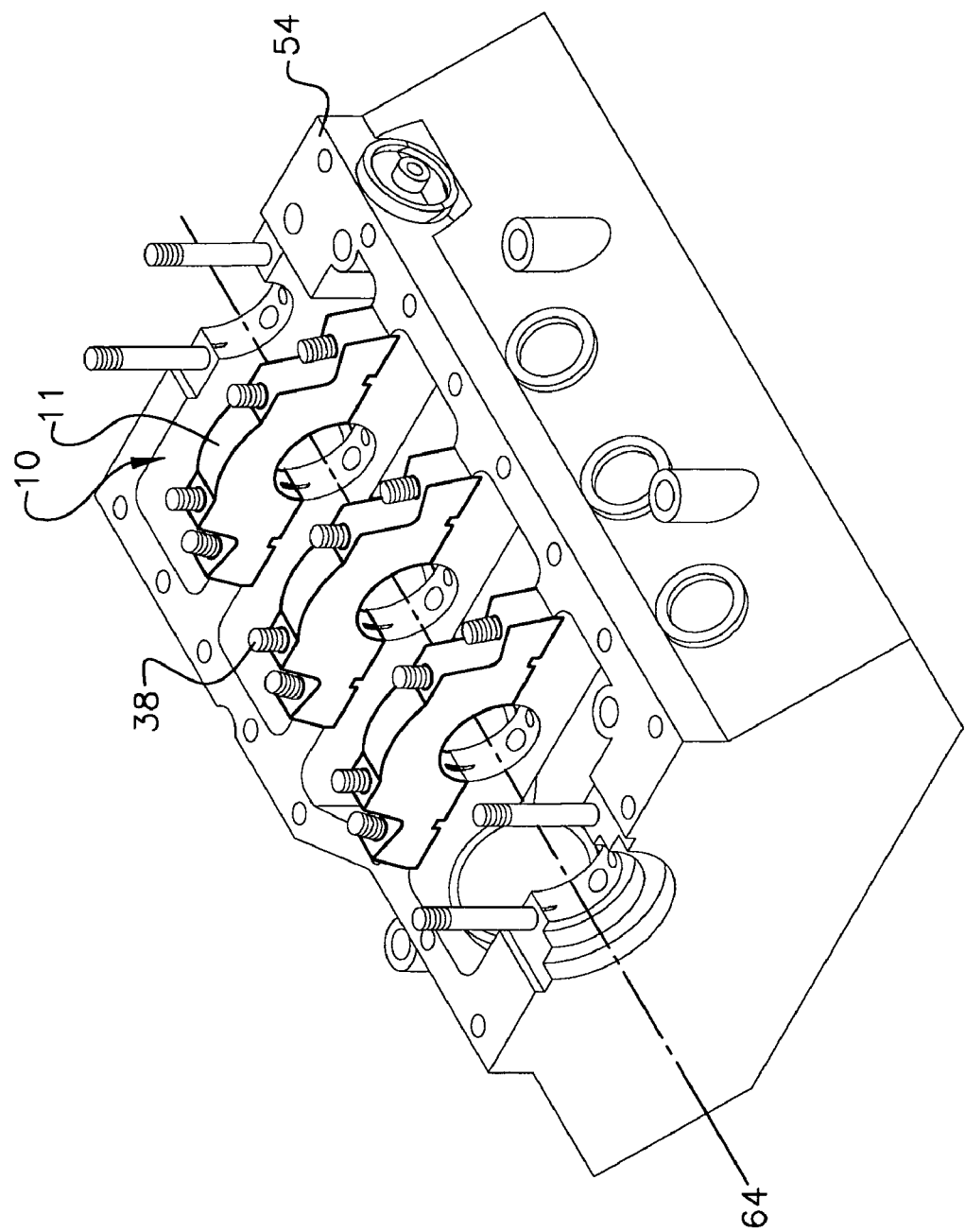
FIG. 8 is a front perspective view of an engine block base as shown in FIG. 7 with installed splay caps of the present invention mounted thereon.

Referring now to the drawings, there is shown in FIGS. 1-8 a preferred embodiment of a locking engine splay cap 10. The art of the present invention represents a unique splay cap 11 and associated engine block base 54 components which collectively form the locking engine splay cap 10. In the preferred embodiment, the locking engine splay cap 10 comprises a splay cap 11 having cap slots 18 within an engine block interface portion 16 which mate with engine block protrusions 66 within an engine block base 54 in order to minimize cap chatter and deformation under high power applications. Unlike prior art splay caps, the present art minimizes the ability of the cap 11 to move inward toward the crankshaft centerline 64 and further minimizes cap material elasticity effects, all in order to provide an optimum cap register.

The splay cap 11 portion of the present invention comprises a top side 12, bottom side 14, a front side 20, a rear side 22, a right side 22 having a right side shoulder 26, and a left side 28 having a left side shoulder 30. The bottom side 14 has an engine block interface 16 of substantially planar form with a cap half bearing seat 32 having a half circular cap seat wall 34 and a cap slot 18 on each side of said seat 32. In a preferred embodiment said slots 18 are approximately 0.180 inch in depth and 0.260 inch in width and transition from said front side 20 to said rear side 22. Said slots 18 are preferably separated and symmetrically positioned relative to a crankshaft centerline 64 and in a single exemplary embodiment separated by approximately 4.8 inches. Alternative embodiments may utilize more than two slots 18 positioned symmetrically or asymmetrically or further utilize slots which do not fully translate between said front side 20 and rear side 22. Preferably said cap seat wall 34 has a cap half seat notch 52 which mates with a conventional protrusion on a main bearing shell half.

From said top side 12 through said bottom side 14 are cap mounting holes 36 and splay mounting holes 37. Said cap mounting holes 36 comprise two holes, each separated and positioned between a cap slot 18 and said seat wall 34. In a preferred embodiment, the cap mounting holes 36 are of the same diameter and separation as those found on a conventional crankshaft bearing cap supplied with the base engine block. Alternative embodiments may utilize other diameters or separations provided the engine block is modified to accommodate such. The splay mounting holes 37 comprise two holes, each separated and positioned at said bottom side 14 between a cap slot 18 and said shoulder 26, 30 in a preferred embodiment. Said splay mounting holes 37 preferably cant or angle toward said shoulder 26, 30 as each transitions from said top side 12 through said bottom side 14. In a preferred embodiment, said top side 12 has one or more steps 15, preferably one at each of said right 24 and left 28 sides, having an angle relative to said engine block interface 16 which is substantially equivalent to said cant angle whereby a head or nut of an attachment bolt 38 positioned through said splay mounting hole 37 may seat flush. In a preferred embodiment, said cant angle is approximately 15 degrees with alternative embodiments utilizing any angle which fits within the geometric limitations of said splay cap 11.

The engine block base 54 of the present art is uniquely formed or modified from a conventional engine block base. Within said block base 54 is the conventional main channel 58 having the engine block half circular seat 46 with a block half seat notch 48 to secure the crankshaft bearing and the threaded cap holes 56 for attachment bolts 38. The present art preferred embodiment leaves the aforesaid substantially unchanged. That is, the main channel 58 into which is seated and registered a conventional main bearing cap is kept at the depth as manufactured with a conventional engine block. A preferred embodiment of the present invention slightly widens said channel 58 approximately 0.020 inch whereby the interface with said splay cap slots 18 mate intimately with perfectly machined and true main channel sidewall 49 surfaces. Alternative embodiments may forego said widening without departing from the scope and spirit of the present invention.

To the right and left of the main channel 58 is a right splay cap channel 60 and a left splay cap channel 62 respectively. Said channels 60, 62 are preferably machined to the same depth as the main channel 58. In a preferred embodiment, each splay cap channel 60, 62 is positioned and machined to a width which preserves separated engine block protrusions 66 on each side of said main channel 58 between said main channel sidewalls 49 and said splay channels 60, 62. Via the aforesaid, the protrusions 66 are formed to substantially the same width as said cap slots 18 whereby each may intimately mate with a corresponding cap slot 18 and provide the secure registration of the present art. The outer walls 65 of each splay cap channel 60, 62 are separated a distance which substantially represents the width between the right side shoulder 26 and the left side shoulder 30 of the splay cap 11. The preferred embodiment forms said outerwall 65 distance approximately 0.003 inch less than the width between the separated shoulders 26, 30 of the splay cap 11.

When assembled, this further provides an intimate mate with said splay cap 11 and engine block base 54 in order to provide yet further registration security. Alternative embodiments may reduce or increase said 0.003 inch tolerance without departing from the scope and spirit of the present invention.

Within each splay cap channel 60, 62 is a threaded splay cap hole 63 which is bored at a canted angle relative to said channels 60, 62 in order to substantially follow the cant angle of said splay mounting holes 37 within said splay cap 11. That is, when an attachment bolt 38 is placed through said canted splay mounting hole 37, it threads without binding into said threaded splay cap hole 63. When assembled with said splay cap 11, said cant angle provides an outward pre-load to said splay cap 11 in order to that the cap 11 is less likely to deform inward toward the crankshaft centerline. Alternative embodiments may utilize more or less than the number of threaded splay cap holes 63 specified in the preferred embodiment without departing from the scope and spirit of the present invention.

Further alternative embodiments of the present art replace the engine block protrusions 66 with block slots of substantially the same width as said protrusions 66 to form keyways and thereafter insert and substitute keys within said block slots to form the equivalent protrusions 66. This alternative embodiment utilizes keys of a height, width, and length whereby said block slots and cap slots 18 are fully filled and intimately mated when the splay cap 11 and engine block are assembled. Still further alternative embodiments invert the position of said protrusions 66 and said cap slots 18. That is, the slot 18 is placed and positioned on the engine block base 54 and the protrusion 66 is placed on said interface 16.

The method of manufacturing and assembly for the locking engine splay cap 10 begins with the splay cap 11 and engine block base 54 as afore described. That is, the splay cap 11 and engine block base 54 are machined, cast, or formed to the specifications described. Obviously particular attention is paid to the dimensional specifications of the cap slots 18 and shoulders 26, 30, especially including the separation width of such, whereby an intimate mate with said engine block protrusions 66 and said outer walls 65 is respectively maintained in order to assure optimum registration. In a preferred embodiment, said splay cap channels 60, 62 are milled within said engine block base 54 yet are not milled at each end bearing cap location where a conventional cap and oil seal would be placed. Alternative embodiments may mill said end bearing cap locations as the preferred embodiment and utilize the splay caps 11 of the present art with non-conventional oil pan sealing means.

Upon completing the aforesaid, the locking engine splay cap 10 is assembled with main bearings, crankshaft, seals, and oil pan substantially as a conventional cap engine as understood by one of ordinary skill within the art. That is, prior to crankshaft and bearing assembly the splay caps 11 are mated and installed, torqued with the attachment bolts 38, and the half seats 32, 46 are bored to the precise bearing seat diameter desired. The splay caps 11 are then removed and upon placement of the bearings and crankshaft, the splay cap 11 is then reseated and re-mated with the engine block base 54. The attachment bolts 38 (usually threaded studs with nuts utilized to secure said splay caps 11) are then inserted through said cap mounting holes 36 and splay mounting holes 37 and threaded with said cap holes 56 and splay holes 63 respectively. The cap slots 18 are intimately mated with said engine block protrusions 66 and each shoulder 26, 30 is intimately mated with the block base 54 outer walls 65. Each of said attachment bolts 38 (typically via said nuts) are optimumly torqued to maintain the mate and register of said splay caps 11. As aforesaid, the outer wall 65 mating is in compression for the preferred embodiment and the attachment bolts 38 within said splay mounting holes 37 further apply a an outward tension upon the body of the splay cap 11.

Those skilled in the art will appreciate that a locking engine splay cap 10 apparatus and method of use and manufacture has been shown and described. Said present art is capable of assuring precise and secure registration of the described main bearing caps whereby cap chatter and deformation are minimized thereby providing improved engine efficiency and durability, especially in high horsepower applications.

Having described the invention in detail, those skilled in the art will appreciate that modifications may be made of the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. A locking engine splay cap for an engine block comprising:

a splay cap having a top side, a bottom side, a front side, a rear side, a right side, a right side shoulder, a left side, a left side shoulder and two or more separated mounting holes from said top side through said bottom side; and said bottom side having an engine block interface and a cap half bearing seat having a cap seat wall; and said engine block interface having two or more cap slots which transition from said front side to said rear side separated and symmetrically positioned relative to a crankshaft centerline between said cap seat wall and said right side and said left side; and an engine block base having two or more threaded mounting holes separated substantially equivalent to said mounting holes, a main channel having one or more engine block half seats and two sidewalls, a right splay cap channel, and a left splay cap channel, each of said channels slightly widened to mate said sidewalls intimately with said cap slots; and each of said splay cap channels having an outer wall, a distance between said outer walls less than a width between said shoulders of said splay cap and capable of providing an intimate mate between said splay cap and said engine block base with a secure registration; and two or more engine block protrusions extending from said engine block base between said sidewalls and said right splay cap channel and said left splay cap channel, said protrusions of a size and position to mate with said cap slots and register said splay cap with said cap slots and said engine block base splay cap channels outer walls whereby when said engine block interface is mated with said engine block base and two or more attachment bolts are threaded through said mounting holes and into said threaded cap holes cap chatter and deformation is minimized.

2. The locking engine splay cap for an engine block as described in claim 1 further comprising:

two or more splay mounting holes at a canted angle relative to said channels within said splay cap each positioned between said cap slots and said right side and said left side; and two or more threaded splay holes at a canted angle relative to said channels within said engine block base positioned to accept said attachment bolts through said splay mounting holes whereby an outward pre-load is provided to said splay cap.

3. The locking engine splay cap for an engine block as described in claim 2 whereby:

said two or more splay mounting holes are canted within said splay cap; and said two or more threaded splay holes within said engine block base are canted at an angle to substantially match said splay mounting hole angles whereby said attachment bolts are accepted through said splay mounting holes without binding.

4. The locking engine splay cap for an engine block as described in claim 3 further comprising:

one or more steps on said top side substantially canted relative to said engine block interface whereby a head or nut of said attachment bolts seats flush with said one or more steps.

5. The locking engine splay cap for an engine block as described in claim 1 whereby said engine block protrusions comprise:

one or more keys within one or more block slots forming keyways.

6. A locking engine splay cap for an engine block comprising:

a splay cap having a top side, a bottom side, a front side, a rear side, a right side, a right side shoulder, a left side, a left side shoulder and two or more separated mounting holes from said top side through said bottom side; and said bottom side having an engine block interface and a cap half bearing seat having a cap seat wall; and said engine block interface having two or more protrusions which transition from said front side to said rear side separated symmetrically and positioned relative to a crankshaft centerline between said cap seat wall and said right side and said left side; and an engine block base having two or more threaded mounting holes separated substantially equivalent to said mounting holes, a main channel having one or more engine block half seats, a right splay cap channel, and a left splay cap channel; and each of said splay cap channels having an outer wall, a distance between said outer walls less than a width between said shoulders of said splay cap and capable of providing an intimate mate between said splay cap and said engine block base with a secure registration; and two or more slots within said engine block base between said main channel and said right splay cap channel and said left splay cap channel, said slots of a size and position to mate with said protrusions and register said splay cap with said slots and said engine block base splay cap channels outer walls whereby when said engine block interface is mated with said engine block base and two or more attachment bolts are threaded through said mounting holes and into said threaded cap holes cap chatter and deformation is minimized.

7. The locking engine splay cap for an engine block as described in claim 6 further comprising:

two or more splay mounting holes at a canted angle relative to said channels within said splay cap each positioned between said protrusions and said right side and said left side; and two or more threaded splay holes at a canted angle relative to said channels within said engine block base positioned to accept said attachment bolts through said splay mounting holes whereby an outward pre-load is provided to said splay cap.

8. The locking engine splay cap for an engine block as described in claim 7 whereby:
   said two or more splay mounting holes are canted within said splay cap; and
   said two or more threaded splay holes within said engine block base are canted at an angle to substantially match said splay mounting hole angles whereby said attachment bolts are accepted through said splay mounting holes without binding.

9. The locking engine splay cap for an engine block as described in claim 8 further comprising:
   one or more steps on said top side substantially canted relative to said engine block interface whereby a head or nut of said attachment bolts seats flush with said one or more steps.

* * * * *